(12) United States Patent
Iizuka

(10) Patent No.: US 8,520,489 B2
(45) Date of Patent: Aug. 27, 2013

(54) OPTICAL DISC MEDIUM, REPRODUCTION METHOD THEREOF AND REPRODUCTION APPARATUS

(75) Inventor: Junya Iizuka, Chigasaki (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 174 days.

(21) Appl. No.: 13/182,092

(22) Filed: Jul. 13, 2011

(65) Prior Publication Data
US 2012/0075970 A1 Mar. 29, 2012

(30) Foreign Application Priority Data
Sep. 24, 2010 (JP) ................................. 2010-213015

(51) Int. Cl.
*G11B 7/24* (2013.01)
(52) U.S. Cl.
USPC ....................................................... 369/275.3
(58) Field of Classification Search
None
See application file for complete search history.

(56) References Cited

U.S. PATENT DOCUMENTS

| | | | | |
|---|---|---|---|---|
| 7,088,651 | B2 * | 8/2006 | Kim ............................ | 369/47.22 |
| 2002/0167888 | A1 * | 11/2002 | Kamioka et al. ......... | 369/124.12 |
| 2003/0002866 | A1 * | 1/2003 | Owa et al. ..................... | 386/126 |
| 2003/0031101 | A1 * | 2/2003 | Kuroda ........................ | 369/47.3 |
| 2003/0123350 | A1 * | 7/2003 | Kim ............................ | 369/47.22 |
| 2006/0098559 | A1 * | 5/2006 | Hino et al. ................. | 369/275.1 |

FOREIGN PATENT DOCUMENTS

| | | |
|---|---|---|
| JP | 2000-113466 | 4/2000 |
| JP | 2003-187459 | 7/2003 |
| JP | 2007-299448 | 11/2007 |

OTHER PUBLICATIONS

H. Ogawa et al., "An Illustrated Guidebook to the Blu-ray Disc," Ohmsha, Ltd., Japan; w/ English excerpts and partial English translation.
H. Ogawa et al., "An Illustrated Guidebook to the Conpact Disc," Ohmsha, Ltd., Japan; w/ English excerpts and partial English translation.

* cited by examiner

*Primary Examiner* — Paul Huber
(74) *Attorney, Agent, or Firm* — McDermott Will & Emery LLP (57) ABSTRACT

The pit arrays on an optical disc medium are made to wobble at a frequency which is higher than the band of frequencies that a tracking servo can follow and which is lower than the band of frequencies of the reproducing signal. A wobble detection signal according to the amount of wobble is obtained from the tracking error signal and used as a reference signal for frequency acquisition. Alternatively, the pit arrays on the medium are wobbled at a frequency which is within the band of frequencies that the tracking servo can follow and which is lower than the band of frequencies of the reproducing signal. In addition, a wobble detection signal corresponding to the amount of wobble is obtained either from the output signal from a compensator included in a tracking servo system or from a tracking drive signal and is used as a reference signal for frequency acquisition.

4 Claims, 12 Drawing Sheets

CASE IN WHICH n/2 PERIOD OF TRACK WOBBLE IS 1 DATA UNIT
(n IS A NATURAL NUMBER; IN THE FIGURE, n = 6)

FIG.4A
PIT ARRANGEMENT & TRAJECTORY OF LIGHT SPOT

FIG.4B
TRACKING ERROR SIGNAL

FIG.5A
CASE IN WHICH 1/2 PERIOD OF TRACK WOBBLE IS 1 DATA UNIT

TRACK OUTER FRINGE (106)
WOBBLE CENTER (501)
TRACK CENTER (105)

FIG.5B
CASE IN WHICH 1 PERIOD OF TRACK WOBBLE IS 1 DATA UNIT

FIG.5C
CASE IN WHICH n/2 PERIOD OF TRACK WOBBLE IS 1 DATA UNIT
(n IS A NATURAL NUMBER; IN THE FIGURE, n = 6)

FIG.5D

RADIAL DIRECTION
CIRCUMFERENTIAL DIRECTION

FIG.5E

: SYNCHRONIZING CODE POSITION OR HEAD POSITION OF DATA SECTOR

OPTICAL DISC MEDIUM, REPRODUCTION METHOD THEREOF AND REPRODUCTION APPARATUS

INCORPORATION BY REFERENCE

The present application claims priority from Japanese application JP2010-213015 filed on Sep. 24, 2010, the content of which is hereby incorporated by reference into this application.

BACKGROUND OF THE INVENTION

The present invention relates to an optical disc medium capable of obtaining a sync clock stably from a reproducing signal. The invention also relates to a reproduction method and reproduction apparatus for the optical disc medium.

For example, patent document 1 (JP-A-2007-299448), non-patent document 1 ("An Illustrated Guidebook to the Blu-ray Disc", edited by Hiroshi Ogawa and Shinichi Tanaka, published by Ohmsha, Ltd., Japan), and non-patent document 2 ("An Illustrated Guidebook to the Compact Disc", written by Hiroshi Ogawa and Heitaroh Nakajima, published by Ohmsha, Ltd., Japan), are available as related art publications.

SUMMARY OF THE INVENTION

An increase in the density of optical disc media has brought the Blu-ray disc (TM) (hereinafter may be abbreviated BD) to market by focusing blue-violet laser light having a wavelength of 405 nm by an objective lens having a numerical aperture of 0.85 to produce a quite small light spot. The Blu-ray disc has achieved the shortest pit length of 0.145 μm and data storage of 25 GB per layer. Furthermore, non-patent document 1, page 247, makes a mention of the possibility that the storage density per layer would be improved to 33 GB. It is expected that still higher densities will be achieved hereafter.

When an optical disc is played back, a data array formed by pits recorded on the disc is discerned from the magnitude of a reproducing signal obtained by detecting the amount of returning light. For this purpose, it is necessary to sample the obtained reproducing signal at accurate and precise timing after performing a focusing servo operation and a tracking servo operation to illuminate the pit array (tracks) with a light spot precisely. In contrast, many optical disc drives have a phase-locked loop (PLL) which receives a reproducing signal and obtains a clock signal phase-locked to each bit transferred. Use of the clock signal makes it possible to identify each bit of data precisely.

However, in order to phase-lock the PLL to the reproducing signal, the difference between the self-oscillating frequency at the initial state and a target transfer frequency must be captured to within some tolerable range (capture range). Generally, the capture range is several percent of the self-oscillating frequency and quite small. Therefore, in a PLL used for reading of an optical disc, it is difficult to previously adjust the self-oscillating frequency within the capture range relative to the target frequency. Accordingly, a frequency capturing means (wide capture circuit) is provided, and the frequency error is suppressed to within the capture range thereby. Then, the phase is captured.

A wide capture circuit used in a conventional optical disc drive is described in patent document 1. This circuit has a first frequency pull-in portion operating based on the frequency error obtained from a sync pattern length discerned by sampling a reproducing signal based on a reproducing clock and a second frequency pull-in portion operating based on a frequency error obtained by detecting a period in which a sync pattern is present. By combining them, the frequency can be captured within the capture range. Furthermore, for an optical disc having periodically wobbled recording guide grooves, the frequency is captured by a third frequency pull-in portion that creates a wobble signal by detection of the amount of wobble and operates based on the frequency error between a step-up clock obtained in synchronism with the wobble signal and the reproducing clock.

Non-patent document 2 describes a push-pull method and a DPD method which are generally used as methods of detecting a tracking error for an optical disc. A tracking error signal obtained by any of these methods makes it possible to obtain an amount of signal roughly proportional to the amount of tracking error in the vicinity of the track center. Therefore, the light spot can be maintained stably and accurately at the center of the track by feeding back the amount of signal.

If the storage density of 33 GB per layer is accomplished by improving only the linear density while still using the laser light having a wavelength of 405 nm and an optical system for an objective lens having a numerical aperture of 0.85, the shortest pit length approaches the limit of the optical resolution of the light spot, it being noted that the laser light and the optical system are adopted in the Blu-ray disc drive.

For a reproduced waveform obtained under these conditions and suffering from quite large inter-code interference, if a conventional method (known as a binary slice method) for comparing the reproduced signal with the center level for each sample is used, it is difficult to identify each bit of data. Consequently, a code identification method known as Partial Response Maximum Likelihood (PRML) is applied. However, in order to apply the PRML, it is required that the reproduced signal be sampled at phase-locked timing. Therefore, this method cannot be applied to frequency acquisition which is provided while a phase-locked condition is not attained. It follows that detection of a sync signal performed by the first and second frequency pull-in portions described in patent document 1 relies on binary slicing. It is impossible to accomplish a stable frequency acquisition.

Periodically wobbling recording guiding grooves are formed only on recordable discs, not on ROM media. Therefore, with a ROM medium of such a structure, even a frequency acquisition relying on the third frequency pull-in portion described in patent document 1 cannot be performed.

As described so far, in a case where the linear density of the existing ROM medium is increased further, a frequency acquisition cannot be provided with the conventional wide capture circuit and it is difficult to reproduce data.

In view of the foregoing circumstances, the present invention has been made. It is an object of the present invention to provide a read-only optical disc medium (ROM medium) capable of providing a frequency acquisition while improving the linear density further. It is another object to provide a reproduction method and reproduction apparatus for the read-only optical disc medium.

As one example, the above objects are achieved by the invention set forth in the appended claims.

According to the present invention, a read-only optical disc medium capable of providing a frequency acquisition while improving the linear density further, a reproduction method for the medium, and a reproduction apparatus for the medium can be offered.

Other objects, features and advantages of the invention will become apparent from the following description of the embodiments of the invention taken in conjunction with the accompanying drawings.

DETAILED DESCRIPTION OF THE INVENTION (First Embodiment)

In a first embodiment of the present invention, the arrays of pits on an optical medium are made to wobble at a frequency which is higher than the band of frequencies that a tracking servo can follow and which is lower than the band of frequencies of the reproduced signal. A wobble detection signal according to the amount of wobble is obtained from the tracking error signal and used as a reference signal for frequency acquisition.

Figures 1A, 1B:
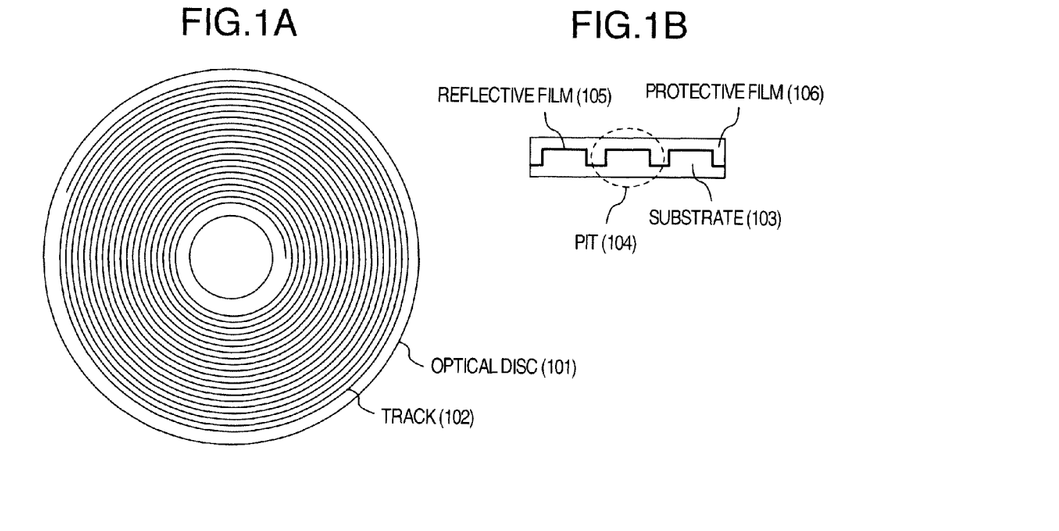
FIG. 1A schematically represents the geometry of an optical disc medium.
FIG. 1B is a schematic cross-sectional view of a read-only optical disc medium.
Figure 1C:
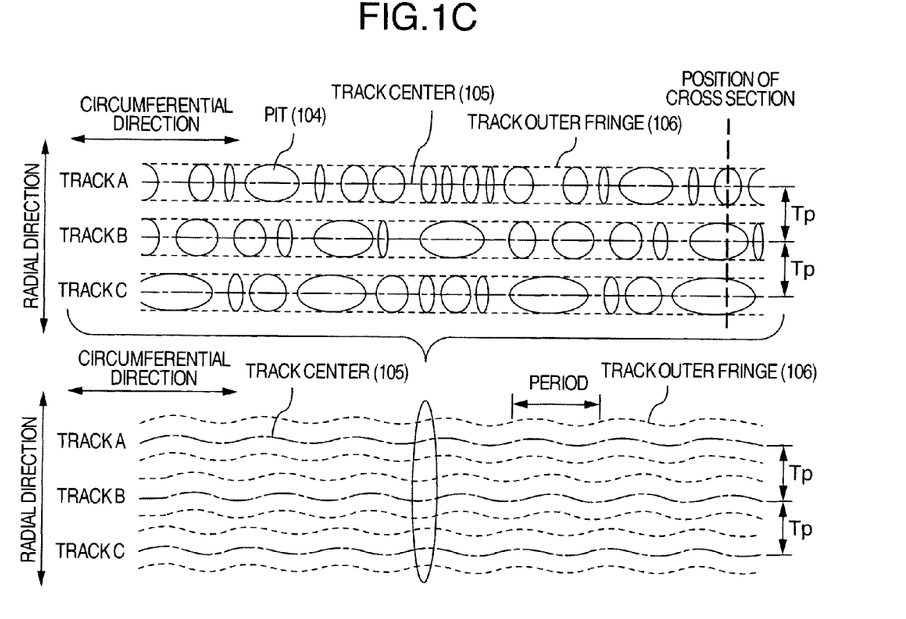
FIG. 1C represents the pit arrangement of the read-only optical disc medium.

The arrangement of pits on the optical disc medium according to the first embodiment is described briefly by referring to FIGS. 1A-1C.

FIG. 1A shows the geometry of one face of the optical disc medium. The optical disc, 101, assumes a disc-like form centrally provided with a hole. During reproduction, the disc is chucked to the spindle of a drive unit and rotated. Pits 104 are spirally arranged at roughly regular intervals to form tracks 102.

FIG. 1B shows a cross-sectional geometry of the optical disc 101. A substrate 103 is molded having one surface on which the pits 104 of a given height are formed as concaves or convexes. A reflective film 105 is laminated on this surface. Furthermore, a protective film 106 is formed. When laser light is directed at the position of any one pit 104, returning light is diffracted. Therefore, the optical disc drive obtains a reproducing signal corresponding either to a tracking error signal or to the pit by detecting either the intensity of light determined by interference between the non-diffracted light (0th-order light) of the returning light and the diffracted light (mainly, +1-st order light and −1-st order light) or the amount of variation in the light.

FIG. 1C is an enlarged view of the tracks 102, showing the pit arrangement. In the upper part of FIG. 1C, pits 104 are shown. Also, their centers and outer fringes are indicated by the dot-and-dash lines and dotted lines, respectively. In the lower part of FIG. 1C, the pits are shown to be compressed in the circumferential dimension and only the centers and outer fringes are shown. As shown in the upper part of FIG. 1C, pits of different lengths are arrayed in the tracks 102. Although not clearly illustrated, the length of each pit along the track is set to an integral multiple of a predetermined length representing a bit of information. As shown in the lower part of FIG. 1C, the pit array is wobbled at regular intervals, which is a feature of the optical medium according to the first embodiment of the present invention.

Reproduction apparatus and reproduction method for the medium of the first embodiment of the present invention are next described briefly. The following description is divided into two sections one of which pertains to tracking control by a servo control system, while the other pertains to processing using a PLL.

(Tracking Control)

Figure 2:
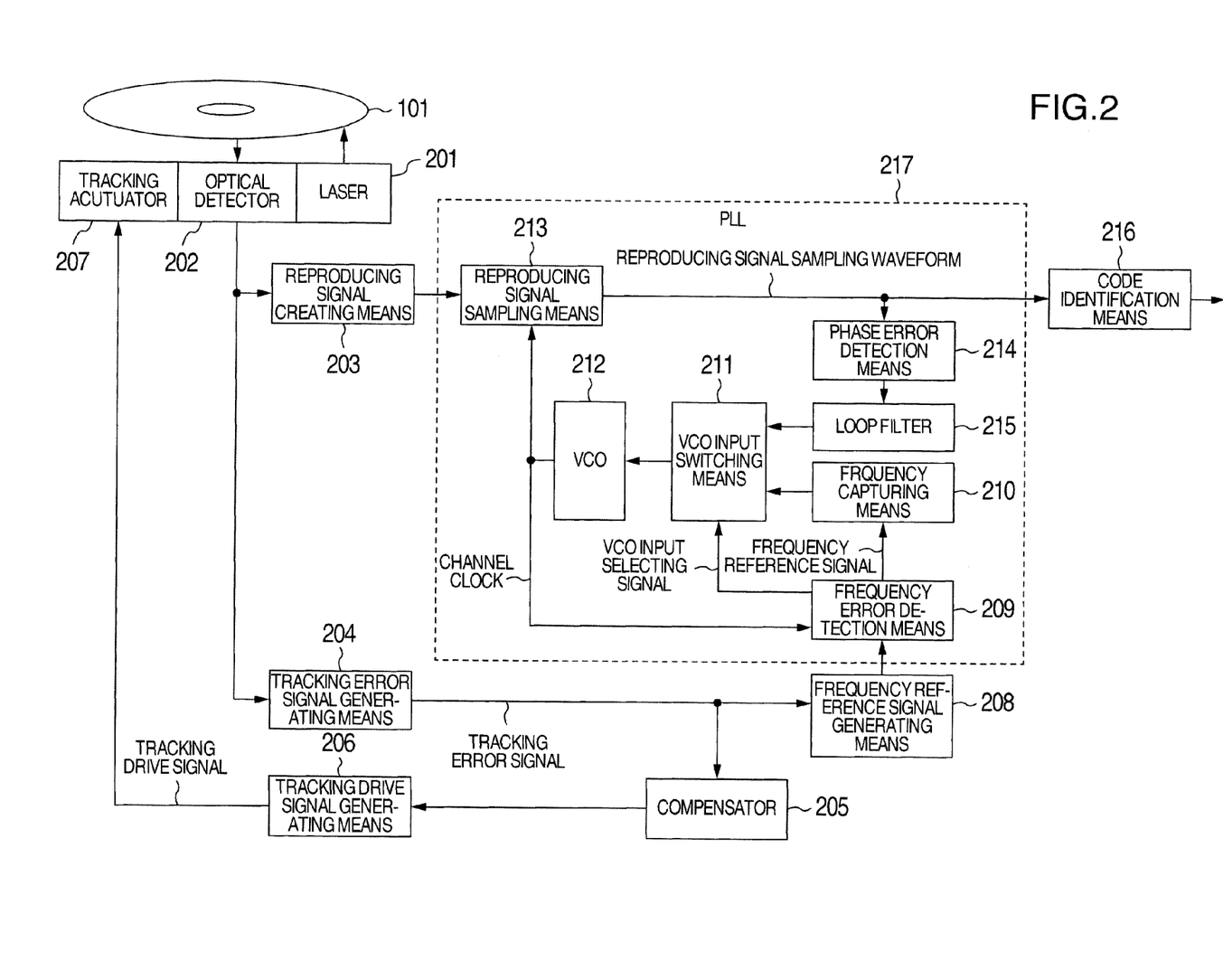
FIG. 2 is a circuit diagram showing one example of configuration of an optical drive unit.

Tracking control and a tracking error signal are described by referring to FIG. 2. The optical disc 101 is being rotated at a prescribed speed by a spindle motor (not shown) in a direction horizontal to the disc surface. Light emitted by a laser 201 is focused to the vicinity of the reflective film 105 of the rotating disc 101 by an objective lens (not shown). Returning light is photoelectrically converted by a optical detector 202.

The optical detector 202 has a detection portion made up of some separate detection elements, each of which produces a detection signal in response to a light spot formed by the returning light, i.e., in response to the strength of the returning light. A tracking error signal generating means 204 performs calculations based on photoelectrically produced signals from the detection elements of the optical detector 202, thus giving rise to the tracking error signal. For example, where a tracking error signal generation method, known as a push-pull method, is used, the tracking error signal is obtained by taking the difference between the intensities of received light from two regions corresponding to two positions where two rays of diffracted light (+1st order light and −1st order light) produced radially of the disc 101 are received.

The tracking error signal obtained in this way is appropriately compensated in phase and amplitude by a compensator 205 and then a tracking actuator 207 is driven by a signal produced by a tracking drive signal generating means 206 to correct the position of the light spot on the optical disc 101 by the light exiting from the laser 201. The laser 201, optical disc 101, optical detector 202, tracking error signal generating means 204, compensator 205, tracking drive signal generating means 206, and tracking actuator 207 described thus far constitute a control loop and provide a negative feedback near the track center. This stabilizes the light spot and permits the spot to be guided onto the tracks 102.

Figure 3:
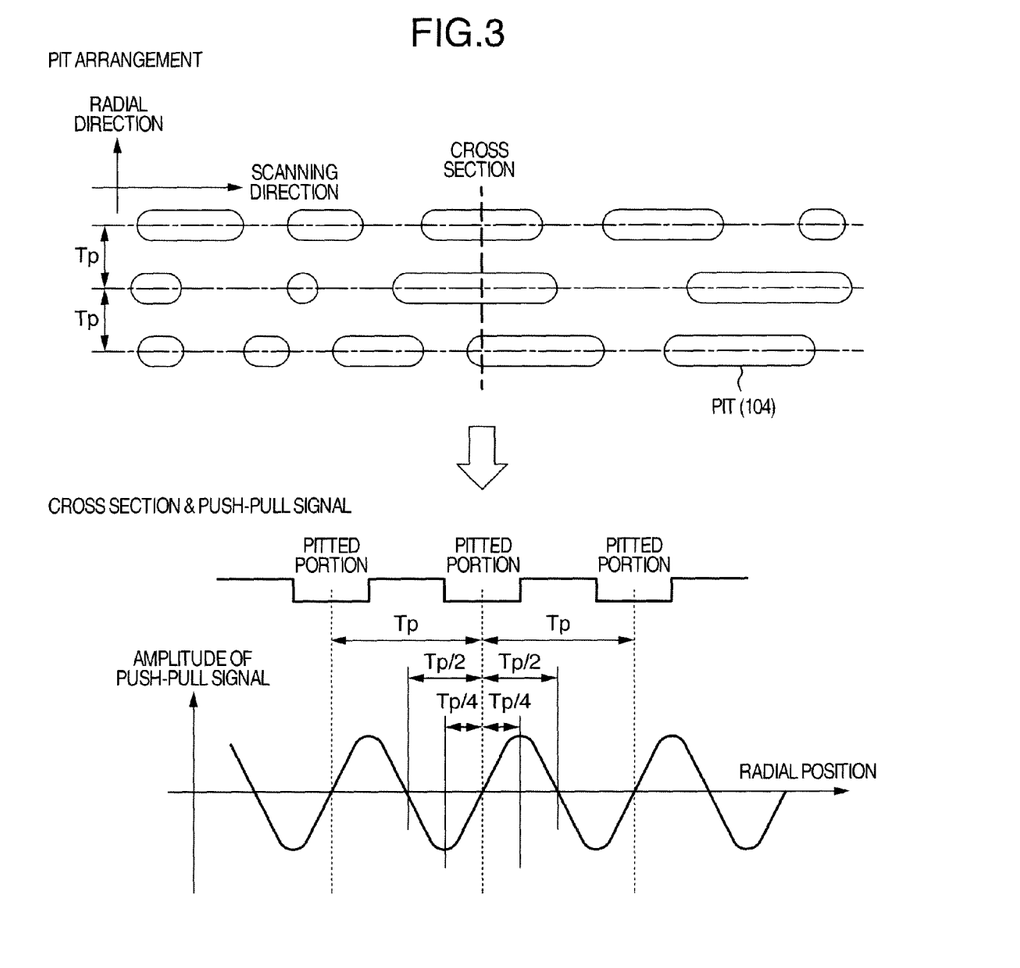
FIG. 3 illustrates the relationship between pits and the amplitude of a push-pull signal.

The signal obtained by the push-pull method is illustrated in FIG. 3. The upper part of FIG. 3 shows a pit arrangement.

Tp indicates the center-to-center spacing (track pitch) of pit arrays. A cross section through the centers as indicated by the dotted lines in the upper part is shown in the lower part. The lower part of FIG. 3 also shows variations in the amplitude of a push-pull signal relative to a radial position. The amplitude varies sinusoidally, and zero crossing points forming stable, balanced points in a control operation are present in the centers of the pit arrays. The sinusoidal curve has a period of Tp relative to the center position of the light spot in the radial direction.

The traceable band is limited by the response characteristics of the tracking actuator 207 or other components of the tracking servo system and by delay in processing computations and so it is impossible to respond to errors having frequency components higher than a given frequency. Let $F_c$ be the cutoff frequency of the closed loop transmission characteristics of this tracking servo system. In the first embodiment of the invention, the wobble period $T_{wob}$ of the tracks, the rotational speed $F_{rot}$ of the disc, the radial position R, and the cutoff frequency $F_c$ have relations satisfying the following Eq. (1).

$$T_{wob} < 2\pi \times R \times F_{rot}/F_c \qquad (1)$$

This indicates the condition under which the wobble period forms a frequency band not traceable by the tracking servo system when the light spot is scanned over the track at a linear velocity of $2\pi \times R \times F_{rot}$.

Figure 4A:
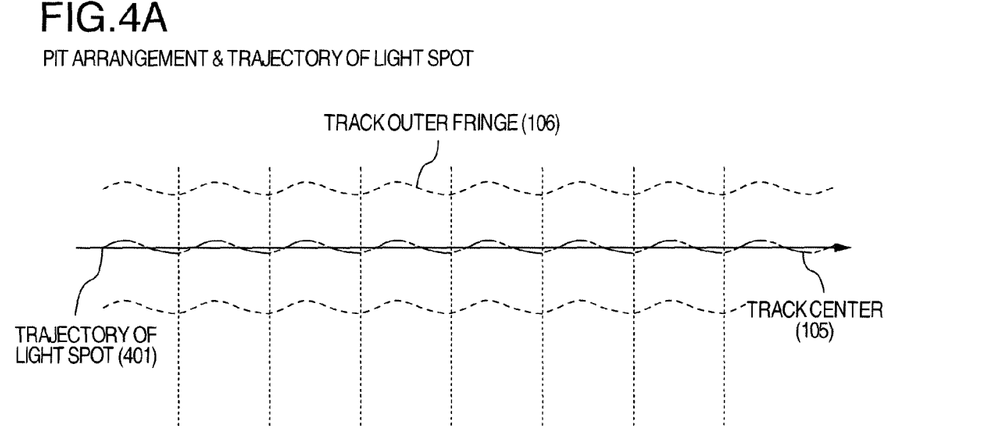
FIG. 4A shows the pit arrangement on a medium and the trajectory of a light spot.
Figure 4B:
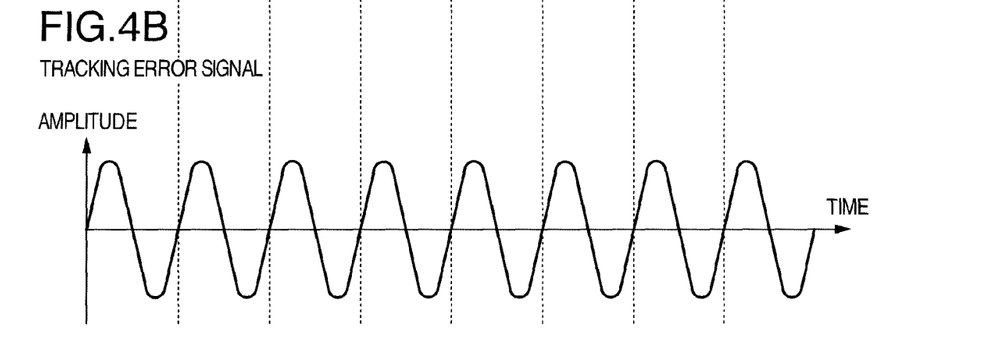
FIG. 4B shows a tracking error signal.

The behavior of the system under these conditions is illustrated in FIGS. 4A and 4B. FIG. 4A shows a pit arrangement and the trajectory of a light spot. The dot-and-dash line indicates the center 105 of a track. The dotted lines indicate the outer fringes 106 of the track. The solid line with an arrow indicates the trajectory 401 followed by the scanning light spot. On the other hand, FIG. 4B indicates variations in the amplitude of the tracking error signal corresponding to the relation between the track and the light spot trajectory 401 shown in FIG. 4A. The track wobbles, while the light spot moves straight without following the wobbling motion of the track. Therefore, a wobbling variation in synchronism with the wobbling motion of the track appears in the tracking error signal according to the amount of deviation between the straight trajectory and the track center 105. In the present embodiment, a frequency acquisition of the PLL is provided based on the wobble period of the tracking error signal.

As the trajectory of the light spot deviates from the track center 105 and the amount of deviation increases, the quality of the reproducing signal deteriorates. Accordingly, if recording is made in phase to reduce the amount of wobble down to zero at positions where precise detection is necessary such as the head regions of data sectors where sync patterns, address information, management information, and other information are stored, then these important patterns can be detected without being affected by track deviations due to the wobbling motion.

Figure 5A:
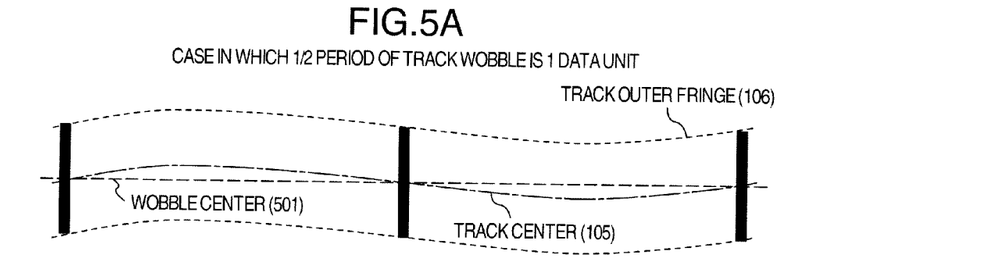
FIG. 5A shows a track in which a ½ period of a wobbling motion is 1 data unit.
Figure 5B:
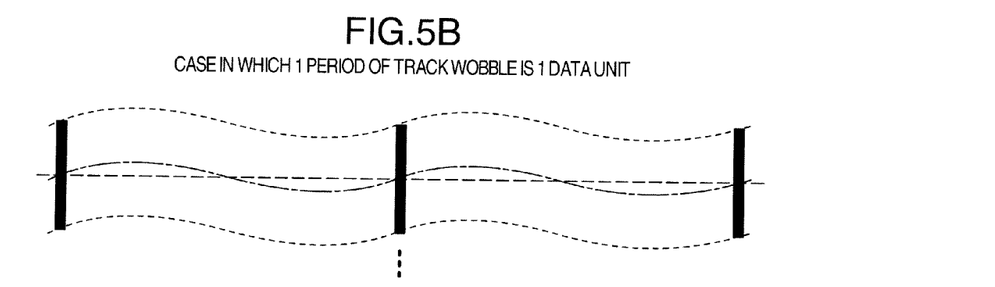
FIG. 5B shows a track in which one period of a wobbling motion is 1 data unit.
Figure 5C:
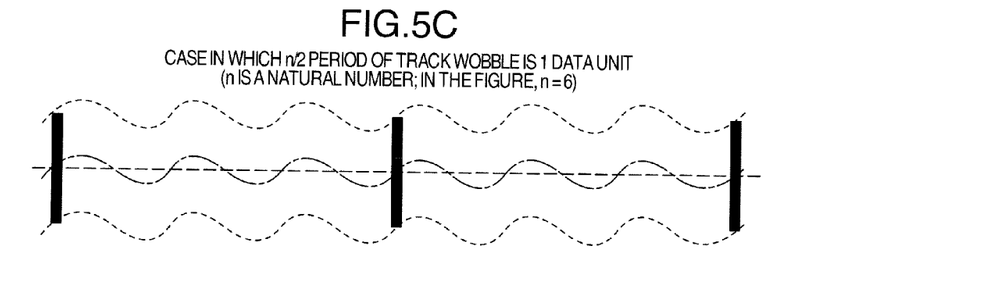
FIG. 5C shows a track in which 3 periods of a wobbling motion is 1 data unit.
Figure 5D:
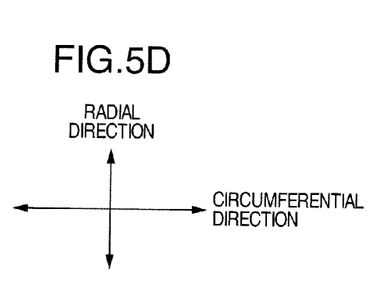
FIG. 5D shows a coordinate system.
Figure 5E:
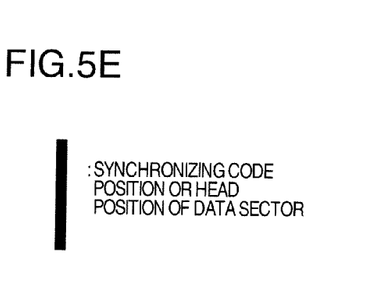
FIG. 5E gives an explanatory note.

FIGS. 5A-5E show one example. The center 501 of wobbling motion indicates the average center position of the track assumed when the amount of wobble is 0. FIG. 5A shows a case in which a ½ period of track wobbling motion is 1 data unit. FIG. 5B shows a case in which 1 period of track wobbling motion is 1 data unit. FIG. 5C is a case in which an n/2 period of track wobbling motion is 1 data unit (where n is a natural number; n=6 in the figure). Thus, the track should be made to wobble with a phase in which the synchronizing code position or the head position of the data sector is the intersection of the track center 105 and the wobble center 501 under the conditions in which the wobble of the track has a period of $T_{wob}$ and in which the period $T_{dat}$ of 1 data unit satisfies Eq. (2). Where the synchronizing code position provides a reference for the wobbling motion, 1 data unit indicates a synchronization frame. Where the head position of the data sector provides a reference, 1 data unit indicates the data sector. Conversely, in cases where a data format to which special error correcting codes stronger than other regions are attached regarding header information is adopted or where the amount of wobble is nonzero, if it is expected that sufficiently precise detection will be possible, priority can be given to the quality of the reproducing signal other than the head region, and the phase of wobble may be intentionally deviated to prevent the header region from assuming the position where the amount of wobble is 0.

$$T_{dat} = \frac{nT_{wob}}{2} \qquad (2)$$

where n is a natural number.

Figure 6:
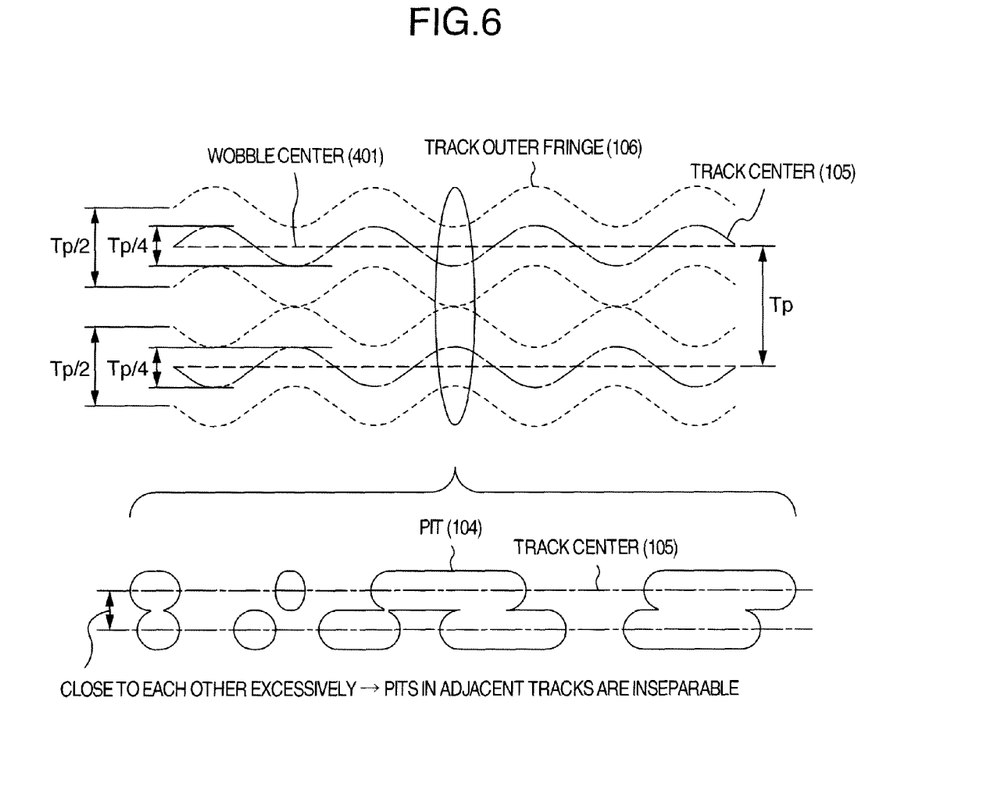
FIG. 6 illustrates the manner in which pits are combined into one when the track is made to wobble excessively.

With respect to the amount of wobble in the radial direction, the variation in the tracking error signal is approximately maximized when the amount of wobble is about ¼ (Tp/4) of the track pitch as shown in the relation of FIG. 3. As the amount of wobble is increased, the track comes closer to the adjacent track. FIG. 3.3 of non-patent document 1 has electron microscope photographs of pits on various read-only discs. It can be seen that the width of each pit on a Blu-ray disc (BD) taken in a radial direction occupies nearly a half of the track pitch. In contrast, when an amount of wobble of Tp/4 is given to the pit array having a width that is ½ of the track pitch, there is the danger that pits in adjacent tracks come close to each other and are combined together at positions where wobble motion relative to the adjacent layer is in antiphase as shown in FIG. 6. If so, the end surfaces of the pits are lost, whereby the diffracted light becomes undesirable. Consequently, a normal tracking error signal is not obtained. Therefore, the amount of wobble should be made less than Tp/4.

On the other hand, non-patent document 1, page 237, states that the target residue of the tracking control of a Blu-ray disc (BD) is ±0.009 µm. Since the track pitch of BD is 0.32 µm as described on page 58 of non-patent document 1, the target residue of the tracking control corresponds to about 1/36 times the track pitch (Tp/36). It is estimated from this that noise equivalent to the amount of tracking error of Tp/36 will be superimposed on the tracking error signal. Therefore, in order to detect the wobbling component, the amount of wobble of the track should be made sufficiently larger than the target residue.

As can be understood from the foregoing, the amount of wobble of the track should be set between Tp/36 and Tp/4. For example, where the amount of wobble is set to about Tp/8, if the pit width is Tp/2, a gap of Tp/4 (obtained by subtracting Tp/4 (twice the amount of wobble) and Tp/2 (pit width) from the track pitch) is secured with the adjacent pit at minimum. Furthermore, the amplitude of a signal obtained by detecting wobble is approximately 4.5 times as large as the residual component of the tracking control. This value of amplitude has been roughly computed from the ratio between Tp/8 and Tp/36 on the assumption that the tracking error signal is linear. In consequence, both can be well achieved at the same time.

(Description of PLL (217))

A PLL (phase-locked loop) 217 (FIG. 2) according to the first embodiment of the present invention is hereinafter described. When a tracking acquisition is completed, a signal of a frequency component synchronized with wobble of the track 102 appears at the tracking error signal. However, the signal quality is not stable because of noise and distortion. A frequency reference signal generating means 208 creates a frequency reference signal, which is stabilized to permit a frequency acquisition of the PLL, from the wobbling component of the tracking error signal and outputs the created signal to the PLL 217.

The PLL 217 includes a reproducing signal sampling means 213, a phase error detection means 214, a loop filter 215, a VCO input switching means 211, a VCO 212, a frequency error detection means 209, and a frequency capturing means 210. Generally, the VCO 212 indicates a voltage-controlled oscillator. In this embodiment, the control signal is not limited to a voltage signal. It may also be an electrical current or digital data.

The frequency error detection means 209 creates a frequency error signal proportional to the difference between the frequency of a channel clock and a target frequency, based on the frequency reference signal from the frequency reference signal generating means 208 and on a channel clock from the VCO 212. The detection means 209 also creates a VCO input selecting signal whose polarity varies depending on whether the absolute value of the frequency error is greater or smaller than a threshold value determined taking account of the capture range of the PLL. The frequency capturing means 210 accumulates the frequency error signal from the frequency error detection means 209 and creates a VCO control signal for frequency acquisition. The VCO input switching means 211 causes the frequency capturing VCO control signal from the frequency capturing means 210 to be outputted to the VCO 212 at a later stage according to the VCO input selecting signal when the frequency error is judged to be equal to or in excess of a given value. The VCO 212 generates a signal at a frequency according to the VCO control signal. Since the VCO 212, frequency error detection means 209, frequency reference signal generating means 208, and VCO input switching means 211 together form a negative feedback loop, the frequency generated by the VCO 212 settles down in time near the target frequency, and the polarity of the input selecting signal of the VCO is inverted. Thus, the frequency acquisition is completed.

When the frequency acquisition is complete, the VCO input switching means 211 switches the signal outputted to the VCO 212 to the phase capturing VCO control signal delivered from the loop filter 215 in response to inversion of the polarity of the VCO input selecting signal and makes a transition to a phase acquisition processing subroutine. The reproducing signal sampling means 213 samples the reproducing signal generated by the reproducing signal generating means 203 in synchronism with a clock signal generated by the VCO 212. The phase error detection means 214 discerns the amount of deviation (phase error) between the clock signal generated by the VCO 212 and a target sampling timing from the sampled reproducing signal and outputs a phase error signal corresponding to the amount of deviation. The loop filter 215 is a compensator for giving appropriate amplitude gain and phase compensation to the phase error signal and creates the VCO input signal for phase acquisition. The VCO input signal for phase acquisition is applied to the VCO 212 via the VCO input switching means 211 to control the oscillating frequency. The reproducing signal sampling means 213, phase error detection means 214, loop filter 215, VCO input switching means 211, and VCO 212 together form a loop which provides a negative feedback. The phase of the oscillating signal from the VCO 212 in time approaches the target phase asymptotically, thus achieving a phase acquisition.

If the phase acquisition permits the reproducing signal to be sampled at desired timing, the recorded data can be identified from the sampled signal by the use of a code identification means 216. The data identified by the code identification means 216 are sent to host equipment via demodulation means, error correction means, and so on (none of which are shown). Where the reproduction is made using a PRML (Partial Response Maximum Likelihood) process, an A/D converter is used as the reproducing signal sampling means 213. The reproducing signal is digitized as well as sampled. The code identification means 216 is made up of a waveform equalizing circuit (made of a digital filter) and a Viterbi decoder circuit.

More specific examples of configurations of the frequency reference signal generating means 208 and frequency error detection means 209 permitting implementation of the present invention are described below.
(Configuration of Frequency Reference Signal Generating Means (208))

Figure 7A:
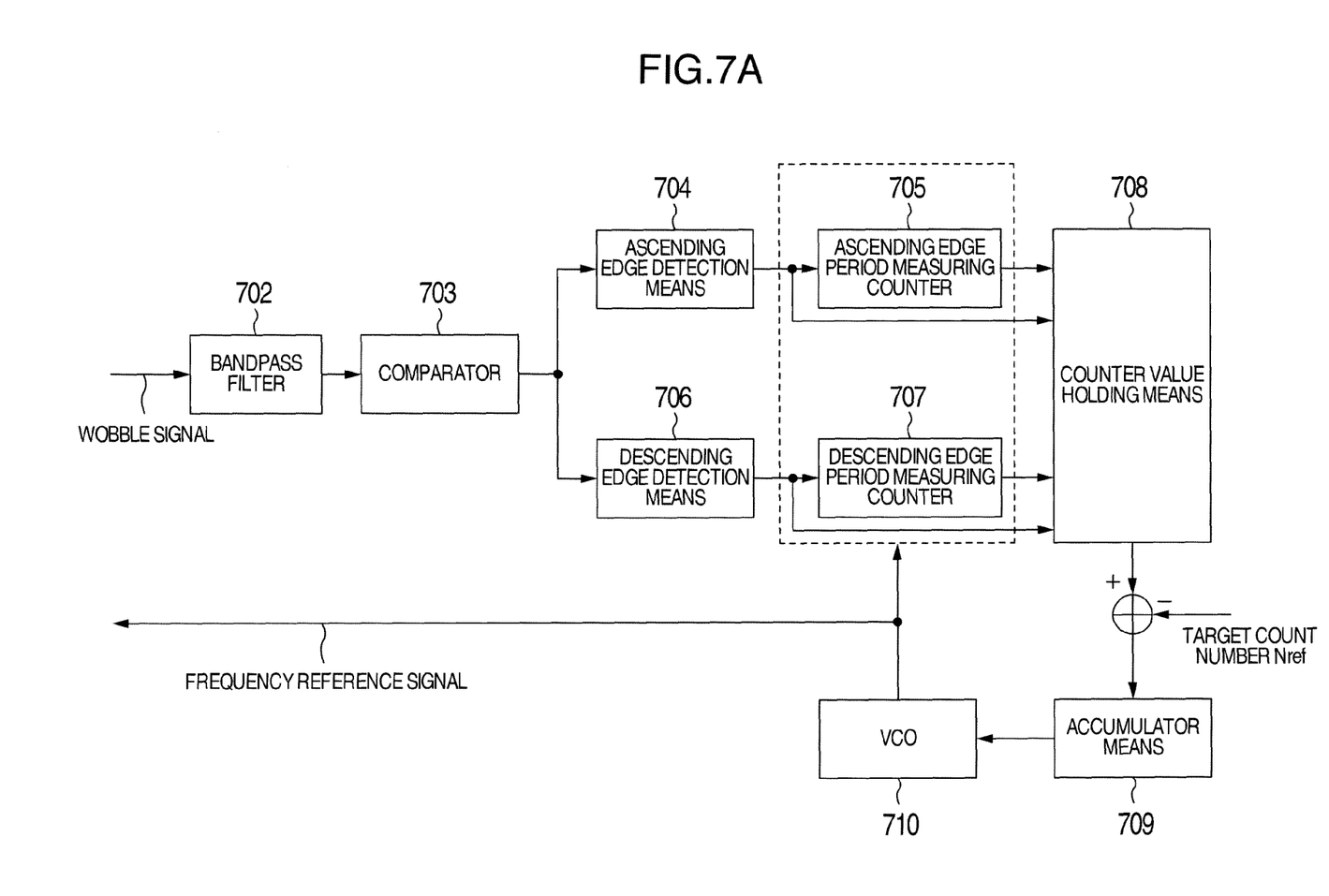
FIG. 7A is a circuit diagram showing one example of frequency reference signal generating means.

An example of configuration of the frequency reference signal generating means 208 is next described.

Figure 7B:
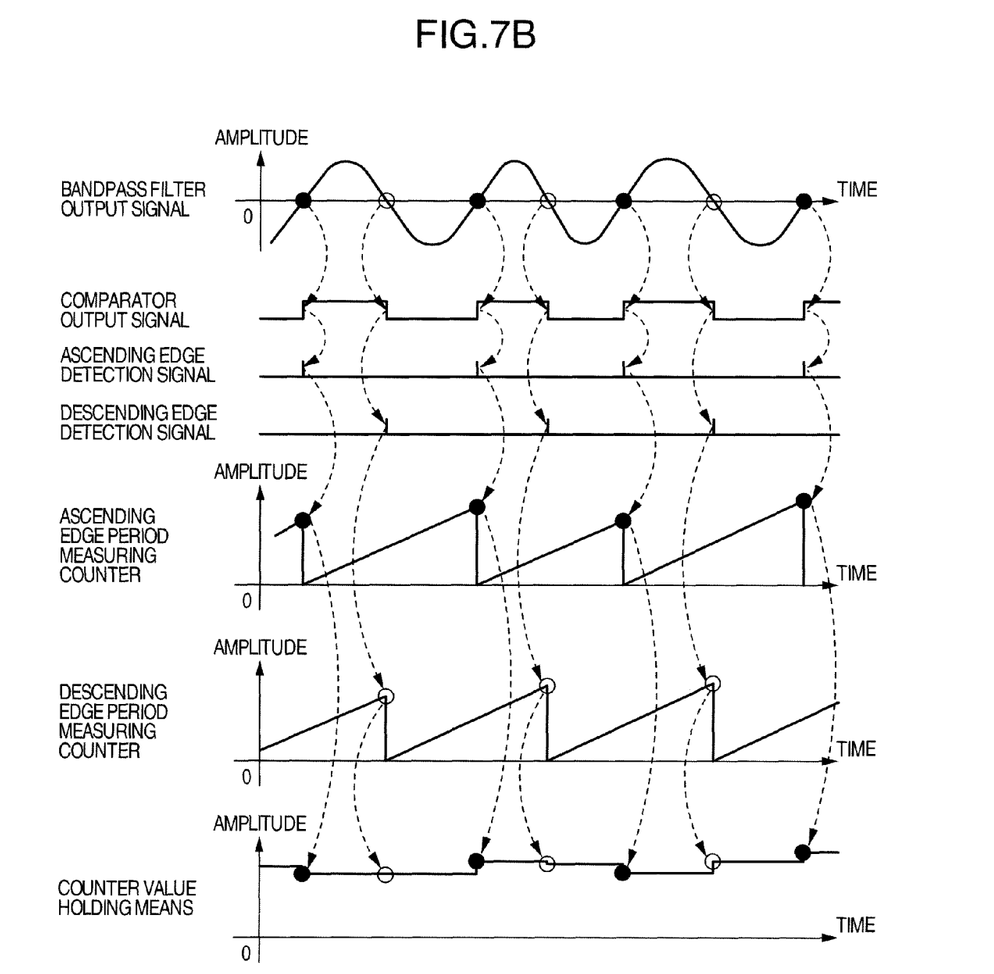
FIG. 7B is a diagram schematically illustrating the operation of the frequency reference signal generating means.

FIGS. 7A-7B show one example of the frequency reference signal generating means 208. FIG. 7A shows the configuration. FIG. 7B schematically illustrates the operation.

A wobble signal 701 is a signal whose amplitude swings according to wobble of a track. In the present embodiment, the wobble signal is a tracking error signal.

A bandpass filter 702 is a filter circuit for suppressing frequency components other than the wobbling component of the wobble signal 701. The filter is required at least to have frequency characteristics which pass the amplitude of the wobbling component. Furthermore, low-frequency components including the DC are suppressed. Therefore, the center level of the output signal is roughly the center of the amplitude of the wobbling component.

A comparator 703 compares the output from the bandpass filter 702 with the center level and outputs a rectangular-wave signal that is binarized in such a way that, when the filter output is greater or smaller than the center level, the rectangular-wave signal goes high or low, respectively.

An ascending edge detection means 704 detects a timing at which the rectangular-wave signal goes from low to high and outputs an ascending edge pulse signal. An ascending edge period measuring counter 705 is a counter whose value is incremented whenever a new clock pulse from a VCO 710 arrives. The counter 705 routes its count to an average period detection means 708 at the timing of the ascending edge pulse signal and clears the count. In order to continue to create the frequency reference signal stably, the VCO 710 is preferably a second VCO different from the VCO 212.

A descending edge detection means 706 detects a timing at which the rectangular-wave signal goes from high to low and outputs a descending-edge pulse signal.

A descending edge period measuring counter 707 is a counter whose value is incremented whenever a new clock pulse from the VCO 710 arrives. The counter routes its count to the average period detection means 708 at the timing of the descending edge pulse signal and clears the count.

The counter value holding means 708 receives and holds the counters' values sent from the ascending edge period measuring counter 705 and the descending edge period measuring counter 707, respectively, at the timings of the ascending edge pulse signal and the descending edge pulse signal, respectively. The difference between the value of the counter value holding means 708 and a preset value $N_{ref}$ is calculated and accumulated in an accumulator means 709. The accumulation value of the accumulator means 709 is applied to the VCO 710 to control the oscillating frequency. The oscillating frequency converges such that the value of the counter value holding means 708 becomes equal to $N_{ref}$ in time. In particular, the converging oscillating frequency is given by $$F_{ref} = \frac{N_{ref}}{N_{wob}} \cdot F_{bit} \qquad (3)$$

where $N_{wob}$ is the ratio of the track length $T_{wob}$ of the period of track wobble to the track length per bit $T_{bit}$ ($T_{wob}/T_{bit}$) and $F_{bit}$ is the channel frequency ($f_{bit}=1/T_{bit}$). That is, the frequency of the VCO 710 converges to an integral multiple ($N_{ref}/N_{wob}$) of the channel frequency $F_{bit}$. Usually, if the value $N_{ref}$ is so selected that $N_{ref}/N_{wob}$ is a simple fractional number, it is easy to fabricate the frequency reference signal generating means as a circuit.

A convergence decision means is used to make a decision as to whether the operation of the frequency reference signal generating means 208 has settled down. The decision means determines that the operation has settled down in a case where the difference between the value of the counter value holding means 708 and the $N_{ref}$ is kept less than a given amount over a predetermined number of wobble cycles. In other cases, the decision means determines that the operation is not yet settled down. The decision means outputs a convergence decision signal based on the result.

(Configuration of Frequency Error Detection Means (209))

Figure 8A:
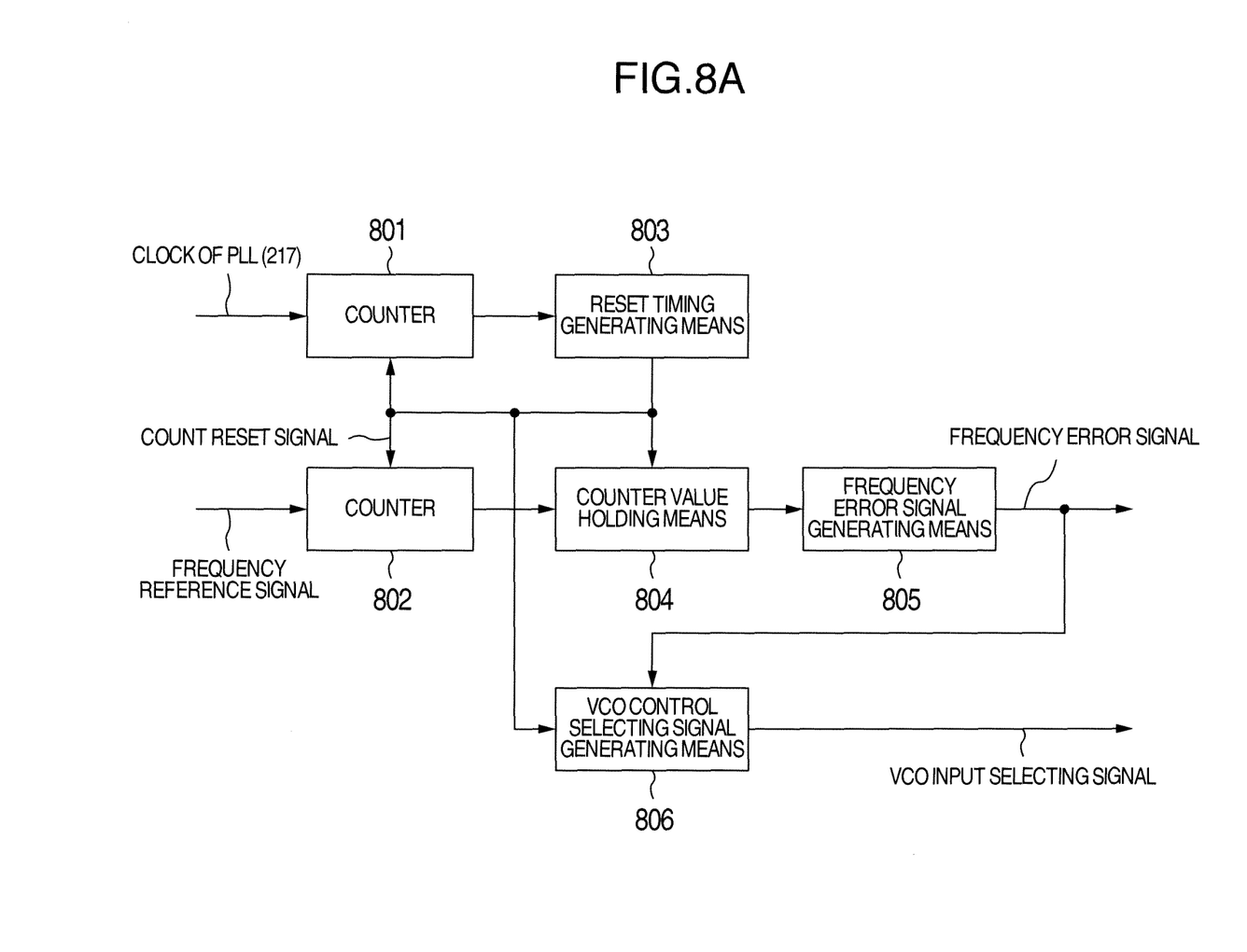
FIG. 8A is a circuit diagram showing a frequency error detection means.
Figure 8B:
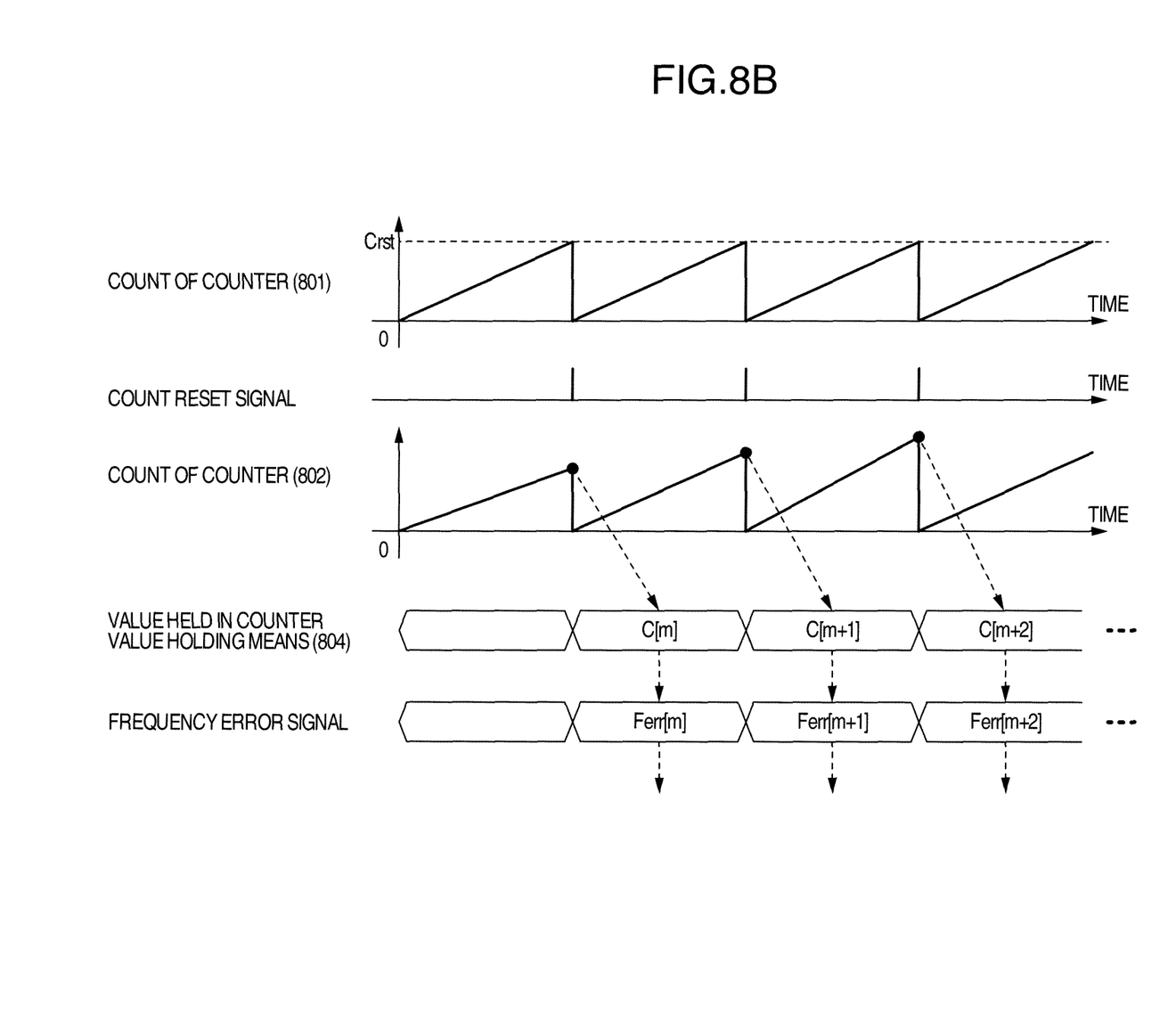
FIG. 8B is a diagram illustrating the operation of the frequency error detection means.

An example of configuration of the frequency error detection means 209 is next described by referring to FIGS. 8A-8B. The detection means 209 has a first counter 801 whose value is incremented with each clock cycle of the PLL 217, a second counter 802 whose value is incremented with each cycle of the frequency reference signal, a reset timing generating means 803, a counter value holding means 804, a frequency error signal generating means 805, and a VCO control selecting signal generating means 806.

The reset timing generating means 803 refers to the count value of the first counter 801 and creates a count resetting signal for resetting the counter 802 at the timing when the count value assumes a given value of $C_{rst}$. In response to this, the values of the first counter 801 and second counter 802 are reset. The counter value holding means 804 holds the value assumed immediately before the second counter 802 is reset.

Let C[m] be the value of the counter value holding means 804 obtained in this way, the numeral in the square brackets ([ ]) indicating the order of the counter reset signal used for sampling. The frequency error signal generating means 805 creates a frequency error signal according to Eq. (4), based on the value of the holding means 804.

$$F_{err}[m] = \frac{N_{ref} C_{rst}}{N_{wob}} - C[m] \qquad (4)$$

The value of the quotient $N_{ref}*C_{rst}/N_{wob}$ indicates the number of gray levels of the detected amount of frequency error. For example, if it is assumed that the value of the quotient is 100, the resolution at which the amount of the frequency error is detected is the reciprocal of that value, i.e., 0.01 (1%). The values of the $N_{ref}$, $N_{wob}$, and $C_{rst}$ should be designed such that that value is less than the capture range of the PLL and that the value of the quotient $N_{ref}*C_{rst}/N_{wob}$ assumes an integer.

Furthermore, the VCO control selecting signal generating means 806 monitors the frequency error signal whenever the count resetting signal appears. The VCO control selecting signal generating means 806 outputs a VCO input selecting signal which causes the VCO input switching means 211 to select the signal from the loop filter 215 in a case where the amount of frequency error indicated by the frequency error signal is retained within the capture range over a period of a predetermined number of count resetting signals and to select the signal from the frequency capturing means 210 in the other cases.

Because of the medium, reproduction processing, and instrumental configuration described so far, a frequency acquisition of the PLL is enabled for a read-only medium recorded with a high density.

(Second Embodiment)

In a second embodiment of the present invention, the pit array on a medium is wobbled at a frequency lower than the band of frequencies that the tracking servo system can follow. In addition, a wobble detection signal corresponding to the amount of wobble is obtained either from the output signal from a compensator included in a tracking servo system or from a tracking drive signal and is used as a reference signal for frequency acquisition.

The difference between the pit arrangement on the optical disc medium according to the second embodiment and the pit arrangement on the optical disc medium according to the above-described first embodiment lies in the relationship between the wobble period and the frequency characteristics of the tracking servo system. This relationship is given by Eq. (5).

$$T_{wob} > 2\pi \times R \times F_{rot}/F_c \qquad (5)$$

Figure 9:
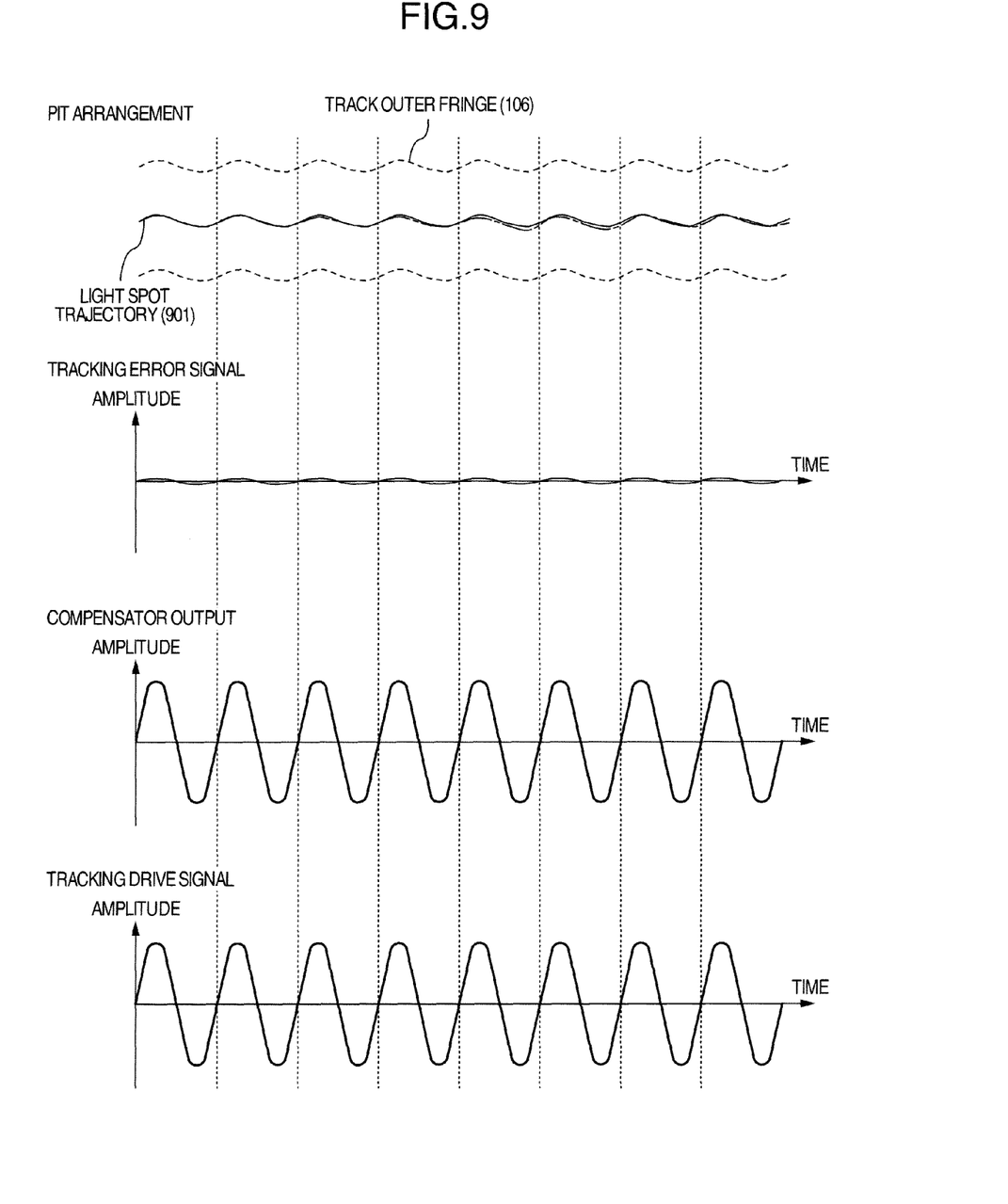
FIG. 9 is a diagram illustrating the relations among the profile of the pit arrangement on an optical medium, a tracking error signal, the output from a compensator, and a tracking drive signal.

The behavior of the signal through the tracking servo system according to the second embodiment is next described by referring to FIG. 9.

The pit array is serpentine in the same way as in the first embodiment but the wobble period is increased because of the relationship given by Eq. (5) and so the tracking servo can follow the wobbling motion. The trajectory 901 of the light spot scans around the track center. Therefore, the amount of tracking error is suppressed. Consequently, variations in the tracking error signal are reduced. On the other hand, in order to activate and cause a tracking actuator to follow wobble of the track, wobbling components appear in the compensator output and in the tracking drive signal. Accordingly, in the second embodiment, a frequency reference signal is created using these signals.

Figure 10:
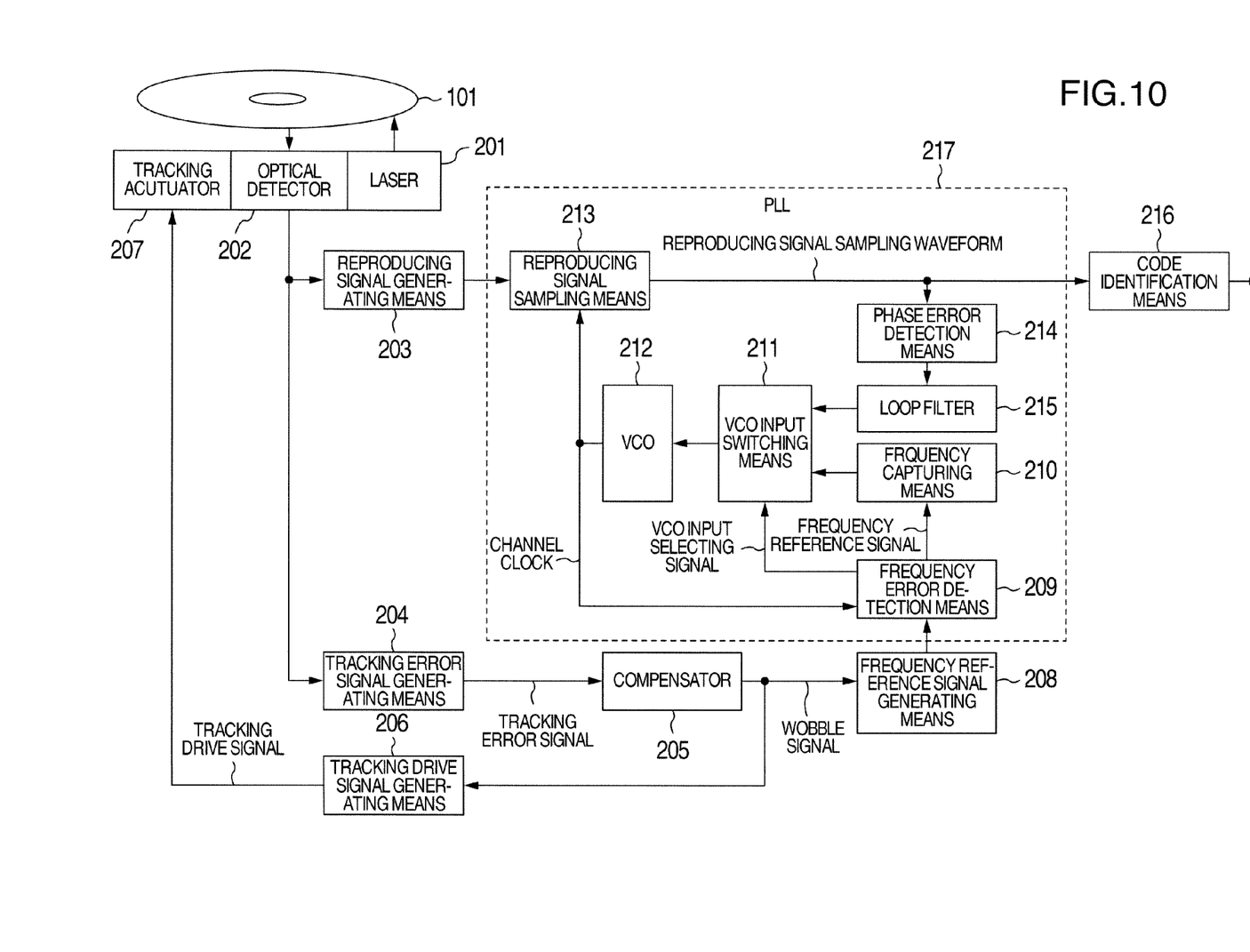
FIG. 10 is a circuit diagram of one example of configuration of a drive unit.

One example of the instrumental configuration permitting data reproduction in accordance with the second embodiment is shown in FIG. 10. The second embodiment is similar in instrumental configuration with the first embodiment of the present invention illustrated in FIG. 2 except that the wobble signal applied to the frequency reference signal generating means 208 is not a tracking error signal but is supplied from the compensator 205 because a wobbling component appears also in the tracking error signal as described previously. The wobbling signal may be a tracking drive signal instead of the output signal from the compensator 205.

In the present embodiment, the trajectory 901 of the light spot scans in the vicinity of the track center. Since the deviation between the track center and the light spot center is reduced in the same way as in the first embodiment, the quality of the reproducing signal can be improved.

Because of the medium, reproduction processing, and instrumental configuration described so far, a frequency acquisition of PLL is enabled for a read-only medium recorded with high density.

It is to be understood that the present invention is not limited to the foregoing embodiments and that the invention embraces various modifications. For example, the above-described embodiments have been described in detail to facilitate understanding the invention. The invention is not always restricted to those having all the configurations described above. Furthermore, some of the configurations of one embodiment may be replaced by configurations of other embodiment. In addition, configurations of other embodiment may be added to the configurations of one embodiment. Further, with respect to some configurations of each embodiment, other configurations may be added, deleted, or replaced.

Some or all of the above-described configurations may be implemented in hardware or realized by execution of a program by a processor. Furthermore, control lines and information lines which are considered to be necessary for explanation are shown. All control lines and information lines for a product are not always shown. In practice, it may be considered that substantially all configurations are interconnected.

Additionally, in the description of the above embodiments, an optical disc player is taken as an example. It may also be an optical disc drive (optical disc player/recorder). The invention can also be applied to reproduction processing performed by a data recording/reproducing apparatus typified by an optical disc drive.

Further, recording media are not limited to optical discs. The present invention can also be applied to various types of recording media.

The invention claimed is:

1. An optical disc medium comprising:
   a track structure in which pits are arranged spirally;
   synchronizing codes arranged at regular intervals in recorded pit arrays; and
   the tracks being wobbled radially;
   wherein an integral multiple of a half of a period of the wobble is coincident with the interval at which the synchronizing codes are arranged; and
   wherein the synchronizing codes are present in positions where the amount of the wobble of the tracks is substantially zero.

2. The optical disc medium of claim 1, wherein the amount of wobble of the tracks is smaller than one fourth of the interval at which the tracks adjacent to each other radially are spaced.

3. The optical disc medium of claim 1, wherein the amount of wobble of the tracks is approximately one eighth of the interval at which the tracks adjacent to each other radially are spaced.

4. An optical disc medium comprising:
   a track structure in which pits are arranged spirally;
   a sector structure formed by recorded information and having sectors each holding a given amount of data, the sectors holding header information therein; and
   header regions in which header information is recorded and which are arranged at regular intervals in recorded pit arrays;
   wherein an integral multiple of a half of a period of the wobble is coincident with the interval at which the header regions are arranged; and
   wherein the header regions are present in positions where the amount of the wobble of the tracks is substantially zero.

* * * * *